United States Patent
Rabie et al.

(10) Patent No.: US 6,547,968 B1
(45) Date of Patent: Apr. 15, 2003

(54) PULSED BACKWASH FOR IMMERSED MEMBRANES

(75) Inventors: Hamid Rabie, Mississauga (CA); Hadl Husain, Brampton (CA); Henry Behmann, Puslinch (CA)

(73) Assignee: Zenon Environmental Inc., Oakville (CA)

( * ) Notice: Subject to any disclaimer, the term of this patent is extended or adjusted under 35 U.S.C. 154(b) by 0 days.

(21) Appl. No.: 09/425,235

(22) Filed: Oct. 25, 1999

Related U.S. Application Data

(60) Provisional application No. 60/146,154, filed on Jul. 30, 1999.

(51) Int. Cl.[7] .............................. B01D 61/00; B08B 3/08

(52) U.S. Cl. .................. 210/636; 210/650; 210/321.69; 134/10; 134/103.1

(58) Field of Search .................... 210/636, 650, 210/785, 797, 798, 321.69, 412, 416.1; 134/10, 103.1

(56) References Cited

U.S. PATENT DOCUMENTS

| | | | | |
|---|---|---|---|---|
| 5,393,433 | A | | 2/1995 | Espenan et al. ............ 210/650 |
| 5,403,479 | A | | 4/1995 | Smith et al. ........... 210/321.69 |
| 5,607,593 | A | * | 3/1997 | Cote et al. |
| 5,643,455 | A | * | 7/1997 | Kopp et al. |
| 5,647,988 | A | * | 7/1997 | Kawanishi et al. ......... 210/636 |
| 5,783,083 | A | * | 7/1998 | Henshaw et al. |
| 5,944,997 | A | * | 8/1999 | Pedersen et al. |
| 5,958,243 | A | * | 9/1999 | Lawrence et al. .......... 210/636 |
| 6,045,698 | A | * | 4/2000 | Cote et al. |
| 6,214,231 | B1 | * | 4/2001 | Cote et al. .................. 210/636 |
| 6,331,251 | B1 | * | 12/2001 | Del Vecchio et al. ....... 210/636 |

FOREIGN PATENT DOCUMENTS

| | | | |
|---|---|---|---|
| FR | 2741280 | 5/1997 | ........... B01D/65/02 |
| JP | 4131182 | 5/1992 | |
| JP | 5184884 | 7/1993 | |
| JP | 07047245 | 2/1995 | |
| JP | 07116482 | 5/1995 | |
| JP | 07136474 | 5/1995 | |
| JP | 899025 | 4/1996 | ........... B01D/65/06 |
| JP | 08099025 | 4/1996 | |
| JP | 08229362 | 9/1996 | |
| JP | 08252438 | 10/1996 | |
| JP | 09075689 | 3/1997 | ........... B01D/65/06 |
| JP | 10066844 | 3/1998 | |
| JP | 10118470 | 5/1998 | |
| JP | 11019488 | 1/1999 | |
| JP | 11128920 | 5/1999 | |
| WO | WO 97/18887 | * 5/1997 | |
| WO | WO98/28066 | 7/1998 | ........... B01D/65/02 |

OTHER PUBLICATIONS

US 6,210,582, 4/2001, Del Vecchio et al. (withdrawn)*
Class 210—Liquid Purification or Separation, United States Patent and Trademark office pp. 6–7, Dec. 1992.*
United States Patent Classification Definitions, Liquid Purification or Separation p. 52, Jun. 1994.*

(List continued on next page.)

*Primary Examiner*—Robert J. Popovics
(74) *Attorney, Agent, or Firm*—Bereskin & Parr

(57) ABSTRACT

A method and apparatus for chemical cleaning microfiltration and ultrafiltration membranes immersed in a tank involves backwashing a chemical cleaner through the membranes while the tank is empty of tank water. A backwash pump which drives the chemical cleaner is controlled by a speed controller which is in turn connected to a programmable logic control and, preferably pressure and flow indicators. The backwash pump is operated to supply the chemical cleaner to the membranes in pulses. The pressure of the pulses is high enough to reduce the relative size of pressure differentials between membranes or portions of membranes in varying places in the tank. The duration and frequency of the pulses is chosen to provide an appropriate contact time of the chemical, preferably without allowing the membranes to dry between pulses and without using excessive amounts of chemical.

12 Claims, 3 Drawing Sheets

OTHER PUBLICATIONS

English Language Abstract of Japanese Publication No. JP09075689, published Mar. 25, 1997.
English Language Abstract of Japanese Publication No. JP08252438, published Oct. 1, 1996.
English Language Abstract of Japanese Publication No. JP07047245, published Feb. 21, 1995.
English Language Abstract of Japanese Publication No. JP07136474, published May 30, 1995.
English Language Abstract of Japanese Publication No. JP11128920, published May 18, 1999.
English Language Abstract of Japanese Publication No. JP10066844, published Mar. 10, 1998.
English Language Abstract of Japanese Publication No. JP08229362, published Sep. 10, 1996.
English Language Abstract of Japanese Publication No. JP11019488, published Jan. 26, 1999.
English Language Abstract of Japanese Publication No. JP04131182, published May 1, 1992.
English Language Abstract of Japanese Publication No. JP07116482, published May 9, 1995.
English Language Abstract of Japanese Publication No. JP5184884, published Jul. 27, 1993.
English Language Abstract of Japanese Publication No. JP6277664, published Oct. 4, 1994.
English Language Abstract of Japanese Publication No. JP8099025, published Apr. 16, 1996.
English Language Abstract of Japanese Publication No. JP8281082, published Oct. 29, 1996.
English Language Abstract of Japanese Publication No. JP9052026, published Feb. 25, 1997.
English Language Abstract of Japanese Publication No. JP10015365, published Jan. 20, 1998.
English Language Abstract of Japanese Publication No. JP10118470, published May 12, 1998.
English Language Abstract of Japanese Publication No. JP52156176, published Dec. 26, 1977.
Translation of Claims for European Patent EP19960939147.
English Language Abstract of French Patent FR2741280.
Derwent Publications Ltd., XP002153239.
Derwent Publications Ltd., XP002153240.
Derwent Publications Ltd., XP002153241.
Derwent Publications Ltd., XP002153127.
Derwent Publications Ltd., XP002153128.
Derwent Publications Ltd., XP002153129.
Derwent Publications Ltd., XP002153130.
Derwent Publications Ltd., XP002153131.
Derwent Publications Ltd., XP002153132.
Derwent Publications Ltd., XP002153133.
"Membrane News", Section 4.12.3 Chemical Cleaning Method of Submarine Type Ceramic Membrane Separation System: Mar. 1998, p. 13.
"Membrane News", Section 4.24 Cleaning Method of Immersion Type Membrane Filter: p. 13.
"Membrane News", Section 4.30 Membrane Separation Method: Sep. 1996, p. 16.
"Membrane News", Section 4.34 Immersion Type Membrane Separation System: Jan. 1997, p. 16.
"Membrane News", Section 4.35 In Situ Cleaning Method of Immersion Type Membrane Filtration System: Jan. 1997, p. 16.
"Membrane News", Section 4.43 Immersion Type Membrane Separation System: Jan. 1997, p. 18–19.
"Membrane News", Section 4.47.1 Submarine Type Membrane Separator and Membrane Cleaning Method of the Same: Dec. 1997, p. 31.
"Membrane News", Section 4.54 Chemical Cleaning Method and System of Immersion Type Membrane Filter: Jan. 1997, p. 22.
"Membrane News", Section 4.56 Cleaning Method of Membrane Module: Jun. 1997, p. 19.
"Membrane News", Section 5.28 Immersion Type Membrane Separator: Aug. 1995, p. 14.

* cited by examiner

PULSED BACKWASH FOR IMMERSED MEMBRANES

This application claims the benefit of Provisional Application No. 60/146,154, filed Jul. 30, 1999.

FIELD OF THE INVENTION

This invention relates to cleaning immersed ultrafiltration or microfiltration membranes with a chemical cleaner.

BACKGROUND OF THE INVENTION

Membranes are used for separating a permeate lean in solids from tank water rich in solids. Typically, filtered permeate passes through the walls of the membranes under the influence of a transmembrane pressure differential between a retentate side of the membranes and a permeate side of the membranes. Solids in the feed water are rejected by the membranes and remain on the retentate side of the membranes. The solids may be present in the feed water in solution, in suspension or as precipitates and may further include a variety of substances, some not actually solid, including colloids, microorganisms, exopolymeric substances excreted by microorganisms, suspended solids, and poorly dissolved organic or inorganic compounds such as salts, emulsions, proteins, humic acids, and others.

Over time, the solids foul the membranes which decreases their permeability. Any solid can contribute to fouling and reduced membrane permeability, and the fouling may occur in different ways. Fouling can also occur at the membrane surface or inside of the pores of the membrane. To counter the different types of fouling, many different types of cleaning regimens may be used. Such cleaning usually includes both physical cleaning and chemical cleaning.

For physical cleaning, permeation through the membranes is typically stopped momentarily. Air or water are flowed through the membranes under pressure to backwash the membranes. The force of the backwash physically pushes solids off of the membranes. Typically, the membranes are simultaneously agitated, for example by aerating the feed water around the membranes with large, scouring bubbles to assist in shearing solids from the surface of the membranes. Such back washing and agitation is partially effective in removing solids from the surface of the membranes, but is not very effective for removing solids deposited inside the membrane pores and is almost ineffective for removing any type of solid chemically or biologically attached to the membranes.

Accordingly, fouling continues despite regular physical cleaning. This continued fouling is countered by cleaning with a chemical cleaner. For example, the membranes may be soaked in one or more cleaning solutions either in the process tank (after it has been drained and filled with chemical cleaner) or in a special cleaning tank. These methods, however, require either large volumes of chemical cleaner (to fill the process tank) or the expense of providing special cleaning tanks and means to move the membranes to the cleaning tank. These methods also disrupt permeation for extended periods of time.

Other methods involve backwashing the membranes with a chemical cleaner. Examples of such methods are described in U.S. Pat. No. 5,403,479 and Japanese Patent Application No. 2-248,836 in which chemical cleaning is performed without draining the tank or removing the membranes from the tank. Permeation is stopped and the membranes are cleaned by flowing a chemical cleaner in a reverse direction through the membranes while the membranes are simultaneously agitated. Although effective, these methods leave residual chemicals in the tank. In wastewater applications, the chemicals interfere with useful biological process in the tank water. In drinking water applications, the chemicals pass through the membranes when permeation is resumed resulting in unwanted concentrations of chemicals in the permeate. Further, some chemical cleaner disperses in the tank water during the cleaning event thus increasing the amount of chemical cleaner required.

French Patent No. 2,741,280 describes another method of backwashing membranes with a chemical cleaner. In this method, the tank water is drained before the chemical backwash begins. When the chemical backwash is over, the cleaner is drained from the tank and the tank is refilled. In this way, the chemical cleaner does not contaminate the tank water or permeate. In a typical municipal installation, however, the tank may range from 1 m to 10 m in depth. The chemical cleaner inside the lower membranes or the lower portions of vertical membranes may be subject to a local pressure up to 100 kPa higher than the local pressure of the chemical cleaner inside the upper membranes or the upper portions of vertical membranes. Since the flow of chemical cleaner through the membranes is dependant on the local pressure of the chemical cleaner inside the membranes, the flow rate of chemical cleaner varies considerably between the upper and lower membranes. As a result, either insufficient cleaner is supplied to the upper portions of the membranes or excess cleaner is supplied to the lower portions of the membranes.

SUMMARY OF THE INVENTION

It is an object of the present invention to provide a method and apparatus for chemical cleaning of immersed microfiltration and ultrafiltration membranes.

According to an embodiment of the invention, the tank is first drained, a chemical cleaner is backwashed through the membranes, the cleaner is preferably removed from the tank, and the tank is refilled so that permeation may continue. A backwash pump which drives the chemical cleaner is controlled by a speed controller which is in turn connected to a programmable logic control and, preferably, pressure and flow indicators. The backwash pump is operated to supply the chemical cleaner to the membranes in pulses.

The pressure of the pulses is selected to be high enough to reduce the relative size of the local pressure differentials in the system, including local pressure differentials between upper and lower membranes or portions of membranes. The duration and frequency of the pulses is chosen to provide an appropriate contact time of the chemical cleaner, preferably without allowing the membranes to dry between pulses and without using excessive amounts of chemical cleaner.

BRIEF DESCRIPTION OF THE DRAWINGS

Preferred embodiments of the present invention will now be described with reference to the following figures.

DETAILED DESCRIPTION OF EMBODIMENTS

Figure 1:
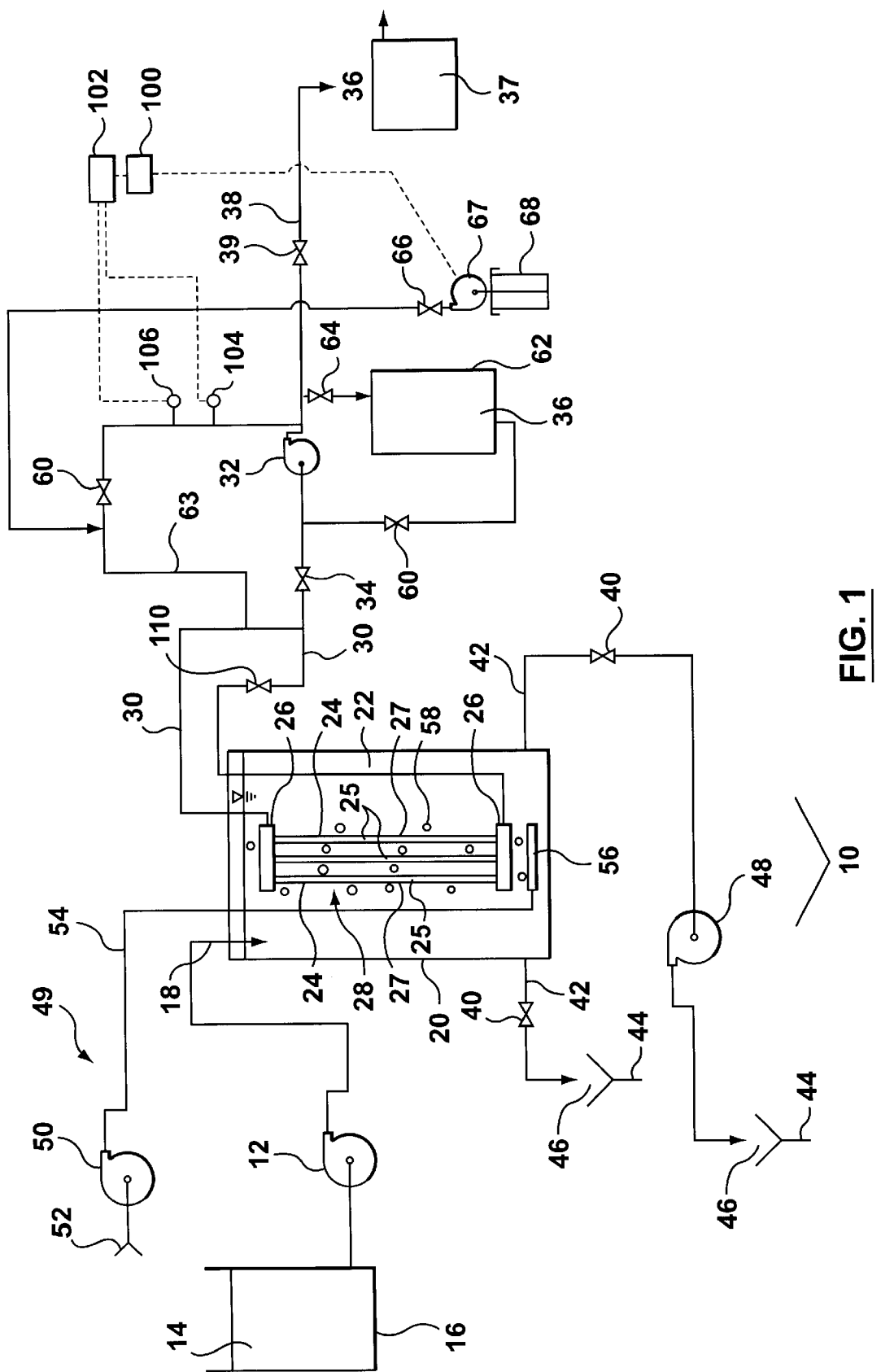
FIG. 1 is a schematic diagram of an embodiment of the invention.

Referring now to FIG. 1, a reactor 10 is shown for treating a feed water 14 having solids. A feed pump 12 pumps feed water 14 to be treated from a water supply 16 through an inlet 18 to a tank 20 where it becomes tank water 22. In an industrial or municipal reactor 10, the tank 20 is typically between 1 m and 10 m deep. During permeation, the tank water 22 is maintained at a level which covers one or more membranes 24. Each membrane 24 has a permeate side 25 which does not contact tank water 22 and a retentate side 27 which does contact the tank water 22.

Membranes 24 made of hollow fibres are preferred although the membranes 24 may be of various other types such as tubular, ceramic, or flat sheet. For hollow fibre membranes 24, the retentate side 27 of the membranes 24 is preferably the outside of the membranes and the permeate side 25 of the membranes 24 is preferably their lumens. The membranes 24 are held between two opposed headers 26. The ends of each membrane 24 are surrounded by potting resin to produce a watertight connection between the outside of the membranes 24 and the headers 26 while keeping the lumens of the hollow fibre membranes 24 in fluid communication with at least one header 26. The membranes 24 and headers 26 together form a membrane module 28. Similar modules can be created with tubular membranes in place of the hollow fibre membranes 24. For flat sheet membranes, pairs, of membranes are typically attached to headers or casings that create an enclosed surface between the membranes. A plurality of modules may also be joined together and referred to as a cassette.

Figure 3:
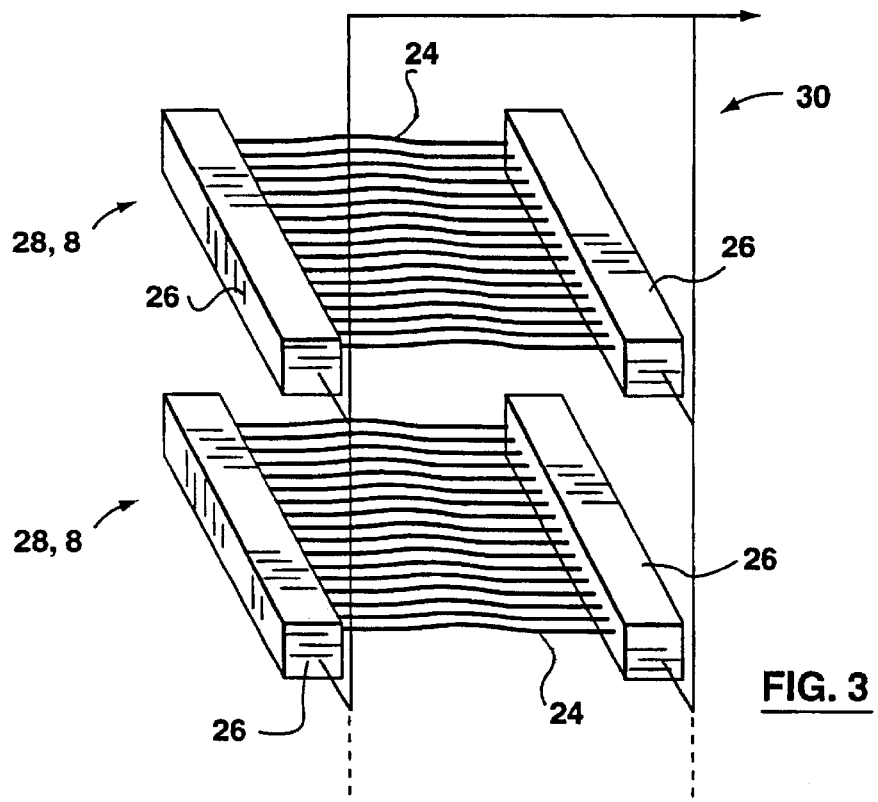
FIGS. 2, 3 and 4 show alternate arrangements of portions of the embodiment in FIG. 1.
Figure 2:
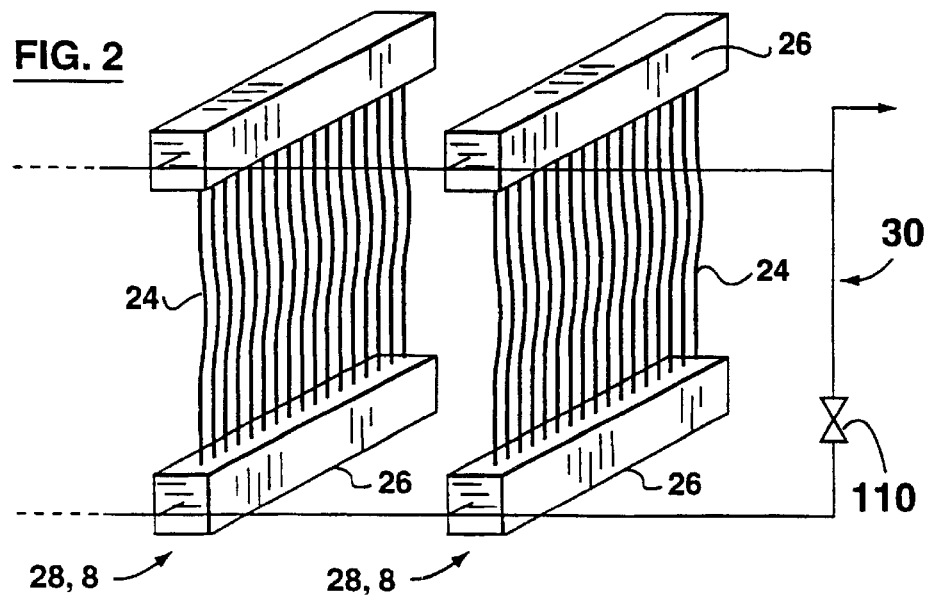
Figure 4:
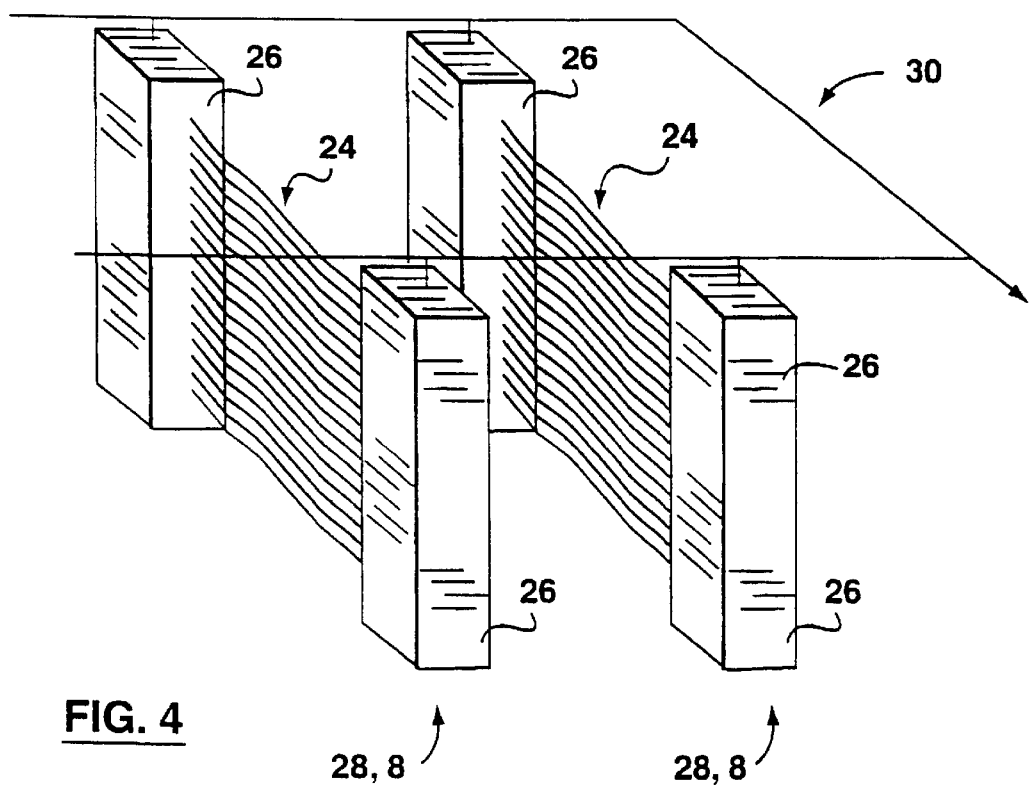

To collect permeate, the headers 26 are connected to a permeate collector 30 and a permeate pump 32 through a permeate valve 34. Referring to FIG. 2, a plurality of membrane modules 28 may be connected to a common permeate collector 30. Depending on the length of the membranes 24 and the depth of the tank 20, the membrane modules 28 shown in FIG. 2 may also be stacked one above the other. Referring to FIGS. 3 and 4, membrane modules 28 are shown in alternate orientations. In FIG. 3, the membranes 24 are oriented in a horizontal plane and the permeate collector 30 is attached to a plurality of membrane modules 28 stacked one above the other. In FIG. 4, the membranes 24 are oriented horizontally, in a vertical plane. Depending on the depth of the headers 26 in FIG. 4, the permeate collector 30 may also be attached to a plurality of these membrane modules 28 stacked one above the other.

Although a small number of hollow fibre membranes 24 are illustrated in each membrane module 28 of FIGS. 1 through 4, a typical module may have a large number of fibres arranged in skeins. For example, the membrane modules 28 illustrated in FIGS. 2 through 4 comprise rectangular skeins 8 each typically having a mass of hollow fibre membranes 24 between 2 cm and 10 cm wide. The hollow fibre membranes 24 typically have an outside diameter between 0.4 mm and 4.0 mm and are potted at a packing density between 10% and 40%. The hollow fibre membranes 24 are typically between 400 mm and 1,800 mm long and mounted with between 0.1% and 5% slack. The membranes 24 have an average pore size in the microfiltration or ultrafiltration range, preferably between 0.003 microns and 10 microns and more preferably between 0.02 microns and 1 micron.

Referring again to FIG. 1, when permeate pump 32 is operated and permeate valve 34 opened, a negative pressure is created on the permeate side 25 of the membranes 24 relative to the tank water 22 surrounding the membranes 24. The resulting transmembrane pressure, typically between 1 kPa and 150 kPa, draws tank water 22 (then referred to as permeate 36) through membranes 24 while the membranes 24 reject solids which remain in the tank water 22. Thus, filtered permeate 36 is produced for use at a permeate outlet 38 through an outlet valve 39. Periodically, a storage tank valve 64 is opened to admit permeate 36 to a storage tank 62. Tank water 22 which does not flow out of the tank 20 through the permeate outlet 38 flows out of the tank 20 through a drain valve 40 in a retentate outlet 42 to a drain 44 as retentate 46 with the assistance of a retentate pump 48 if necessary. The retentate 46 may be withdrawn from the tank 20 either continuously or periodically.

During permeation, solids accumulate on the surface of the membranes 24 and in their pores, fouling the membranes 24. Physical techniques may prevent some of this fouling. Firstly, the membranes 24 may be agitated, possibly by mechanically agitating the tank water 22 near the membranes 24 but preferably by aerating the tank water 22 near the membranes 24. For this, an aeration system 49 has an air supply pump 50 which blows air from an air intake 52 through air distribution pipes 54 to one or more aerators 56 located generally below the membrane modules 28 which disperses air bubbles 58 into the tank water 22. The air bubbles 58 agitate the membranes 24 and create an air-lift effect causing tank water 22 to flow upwards past the membranes 24, all of which inhibits fouling of the membranes 24.

In addition to aeration, the membranes 24 are backwashed periodically. For this, permeate valve 34 and outlet valve 39 are closed while backwash valves 60 are opened. Permeate pump 32 pushes filtered permeate 36 from storage tank 62 through a backwash pipe 63 to the headers 26 and through the walls of the membranes 24 in a reverse direction thus pushing away some of the solids attached to the membranes 24. At the end of the backwash, backwash valves 60 are closed and permeate valve 34 and outlet valve 39 re-opened. Such backwashing may occur for a period of 15 seconds to one minute approximately every 15 minutes to an hour. Permeate 36 may be stored in a permeate tank 37 to even out minor disruptions in the flow of permeate 36. As an alternative to using the permeate pump 32 to drive the backwash, a separate pump can also be provided in the backwash line 63 which may then by-pass the permeate pump 32.

As mentioned earlier, backwashing and the use of air bubbles 58 to clean the membranes 24 fails to effectively inhibit all types of fouling, particularly fouling caused by solids deposited inside the membrane pores and solids chemically or biologically attached to the membranes. This type of fouling is countered by chemical cleaning.

To clean the membranes 24 with chemical cleaner, permeation is temporarily stopped, permeate valve 34, outlet valve 39 and backwash valves 60 are all closed and permeate pump 32 is turned off. Feed pump 12 is turned off and tank water 22 is drained out of the tank 20 by opening drain valves 40 and turning retentate pump 48 on if necessary. When the level of the tank water 22 is below the membranes 24, chemical cleaner is flowed through the walls of the membranes 24. The chemical cleaner used may be any chemical appropriate for the application and not overly harmful to the membranes 24. Typical chemicals include sodium hypochlorite, citric acid and sodium hydroxide. The chemical cleaner may be used in a non-liquid form such as by flowing chemical in a gaseous state to the headers 26 or introducing it as a solid into the backwash line 63. Liquid chemical cleaners are preferred, however, because they are easier to handle and inject in the proper amounts.

To flow chemical cleaner through the walls of the membranes 24, chemical valve 66 is opened and chemical pump 67 turned on to flow chemical cleaner from chemical tank 68 to backwash line 63, headers 26 and through the walls of the membranes 24. A lower header cut-off valve 110 is preferably closed so that chemical cleaner flows only into the upper header 26. In each cleaning event, the chemical pump 67 is turned on and off repeatedly to provide the chemical cleaner in pulses. In each pulse, the chemical pump 67 is turned on for between 10 seconds and 120 seconds, preferably about 60 seconds for drinking water applications, and turned off for between 30 seconds and five minutes, preferably about three minutes for drinking water applications.

Preferably, the time that the chemical pump 67 is turned off approximates the time required for a dose of chemical to either flow out of the pores of the membranes 24 or to be substantially consumed through reactions with solids such that the membranes 24 are no longer effectively wetted with chemical cleaner. This time may vary with the packing density and configuration of the membrane module 28, the diameter of the membranes 24 and other factors. Providing too short a time between pulses wastes chemical cleaner by forcing it into the tank 20 prematurely while providing too long a time between pulses wastes process time because the chemical cleaner is not sufficiently efficacious for the entire time. Conversely, the time that the chemical pump 67 is turned on preferably approximates the time required to effectively re-wet the membranes 24 to an initial wetness. In this way, chemical cleaner contacts the membranes 24 for substantially the duration of the cleaning event.

The pressure of the pulses is preferably high enough to substantially reduce the relative size of head losses in the system, differences in head loss across parts of membranes 24 with different permeabilities because of uneven fouling and differences in local pressure inside the lumens of the membranes 24 caused by differences in elevation in the tank 20. With less variation in the flow of chemical cleaner from one part of the membranes 24 to another, less chemical cleaner is required to achieve a minimum level of cleaning throughout the membranes 24. The pressure for the backwash typically ranges from between 10 and 55 kPa.

The pulsed chemical cleaner delivery is particularly beneficial for modern submerged outside-in hollow fibre membranes 24 which may be between 1 meter to 3 meters in length, resulting in significant pressure drop in the lumens of the membranes 24, but having unfouled permeability of a few hundred litres per square meter per hour per bar of transmembrane pressure ($L/m^2/h/bar$) or more. In particular, with chemical cleaner flowing into the upper header 26 only of a membrane module 28 with vertical hollow fibre membranes 24, the head loss in the lumens of the membranes 24 assists in reducing the flow of chemical cleaner through the lower portions of the membranes 24 which, as explained above, tend to receive too much chemical cleaner. With such membranes 24 and chemical cleaner flowing into upper headers 26 only, and depending on the expected fouled permeability of the membranes 24, the pressure of an effective backwash can be near the lower limit of the range specified above and corresponds to an average flux of between 30 and 55 $L/m^2/h$.

For example, a ZW 500 membrane module manufactured by ZENON Environmental Inc. has vertical hollow fibre membranes approximately 1650 mm in length. In a test with partially fouled fibres having a permeability of 250 $L/M^2/h/bar$ and backwashing from the top header only, backwashing at 7 kPa resulted in a flux of chemical cleaner through the membranes varying from about 17 $L/m^2/h$ at the top of the membranes to about 39 $L/m^2/h$ at the bottom of the membranes. Backwashing at 22 kPa resulted in a flux of about 54 $L/m^2/h$ at the top, about 50 $L/M^2/h$ near the middle and about 61 $L/M^2/h$ near the bottom of the fibres. Thus backwashing at 22 kPa substantially reduced the variation in flux across different parts of the membranes.

The pressure of the pulses is controlled by altering the speed of the chemical pump 67 with a speed controller 100. Based on the expect ed permeability of the membranes 24 when fouled, the flux through the membranes at a given pressure can be calculated. From this flux the speed of the chemical pump 67 can also be calculated. The speed controller 100 can thus be set to run the chemical pump 67 at this speed during the parts of the chemical backwash cycle during which the chemical pump 67 is on.

Preferably, the speed controller 100 is controlled by a programmable logic controller 102. The programmable logic controller (PLC) 102 is programmed to turn the chemical pump 67 on and off in repeated cycles for the duration of the cleaning event. The PLC 102 starts each on portion of a cleaning event with the chemical pump 67 at the speed calculated above. Optionally, a pressure gauge 104 senses the pressure in the backwash line 63 and converts this information to an analog current or potential signal, preferably a 4–20 mili-amp current signal, proportional to the pressure. The PLC 102 converts this signal to a pressure reading and compares the pressure reading to the desired pressure which is entered into the PLC 102 by an operator. Based on the comparison, the PLC 102 in turn sends an analog current or potential signal, preferably a 4–20 mili-amp current signal, to the speed controller 100. The speed controller 100 changes the frequency of the electric current to the chemical pump 67 in proportion to the signal presented by the PLC 102, which changes the speed of the chemical pump 67, and hence, the chemical cleaner flux and pressure. If the pressure is below the desired value, the speed of the chemical pump 67 is increased by the PLC 102 and conversely decreased if the pressure is too high. In this way, increases in the permeability of the membranes 24 as they are cleaned are compensated for by increasing the speed of the chemical pump 67.

Further optionally, a flow sensor 106 in the backwash line 63 measures the increase in chemical flux caused by such increases in speed of the chemical pump 67 and converts this information to an analog current or potential signal, preferably a 4–20 mili-amp current signal proportional to the flux. The, PLC 102 converts this signal to a flux reading. As the chemical flux increases, the time taken to re-wet the membranes 24 decreases. Accordingly, the PLC 102 is programmed to shorten the length of time during which the chemical pump 67 is turned on as the flux of chemical cleaner increases.

After the chemical cleaning is completed, chemical pump 67 remains, turned off and chemical valve 66 is closed. Preferably, the backwash valves 60 are opened and permeate pump 32 operated to provide a rinsing backwash to remove chemical cleaner from the backwash line 63 and permeate collectors 30. Drain valves 40 are then closed and feed pump 12 turned on to refill the tank 20.

The effectiveness of a chemical cleaning event may be approximated by multiplying the concentration "C" of the chemical cleaner and the time, "T", that the chemical cleaner effectively wets the membranes 24 to create a third parameter "CT". The preferred CT for each event is selected by an operator according to his or her preferred chemical cleaning regimen, for example a maintenance cleaning regimen as will be described below. Once the CT is selected, a concentration of chemical cleaner is selected. In possible alternative embodiments, the chemical cleaner may be diluted before it reaches the membranes 24. For example, with appropriate modifications to the procedure and apparatus above, backwash valves 60 can also be opened and permeate pump 32 used to flow permeate 36 through backwash line 63 where it mixes with chemical cleaner from the backwash line 63. The concentration of the chemical cleaner is therefore measured as the chemical cleaner meets the permeate side 25 of the membranes 24 and is typically between 20 and 200 mg/L when NaOCl is used. Once C is known, T can be calculated and entered into the PLC 102 which is programmed to start a timer with the first pulse of chemical cleaner and continue to provide chemical cleaner pulses until T is reached on the timer. More typically, however, T is made to be an even multiple of a selected time between pulses and the PLC is programmed to provide a selected number of pulses.

In a maintenance cleaning regimen, the cleaning events are started before the membranes 24 foul significantly and are repeated between one and seven times a week, preferably between 2 and 4 times a week. For drinking water applications, each cleaning event involves between 5 and 30 pulses, preferably between 6 and 10 pulses times, with a total duration between 10 and 100 minutes, preferably about 30 minutes. Since the cleaning events may be repeated with varying frequency for different applications or concentrations of solids in the feed water 14, a parameter called the weekly CT is used as a basis for some calculations. The weekly CT is the sum of the CT parameters for the cleaning events performed during a week.

The desired weekly CT is preferably chosen to maintain acceptable permeability of the membranes 24 or to reduce the rate of decline in permeability of membranes 24 over extended periods of time, preferably between 15 days and three months, so as to reduce the frequency of intensive recovery cleanings rather than to provide recovery cleaning itself. In some drinking water applications, however, intensive recovery cleanings can be postponed almost indefinitely. There may be a slight instantaneous increase in permeability of the membranes 24 after a cleaning event, but this permeability gain is typically lost before the next cleaning event and is not significant enough to be considered recovery cleaning.

For drinking water applications, the weekly CT is preferably in the range of 2,000 min*mg/L to 20,000 min*mg/L when NaOCl is the chemical cleaner and more preferably between 5,000 min*mg/L and 10,000 min*mg/L of NaOCl. When other chemical cleaners are used, the concentration of the chemical cleaner is expressed as an equivalent concentration of NaOCl that has similar cleaning efficacy. For example, for citric acid preferred values are approximately 20 times those given for NaOCl and for hydrochloric acid preferred values are approximately 4 times the values given for NaOCl. The precise weekly CT to use in a given application is preferably chosen to achieve a gradual decline in permeability over an extended period of time.

It is to be understood that what has been described are preferred embodiments to the invention. The invention nonetheless is susceptible to certain changes and alternative embodiments fully comprehended by the spirit of the invention as described above, and the scope of the claims below.

We claim:

1. A method for cleaning filtering membranes, each membrane having a permeate side, normally immersed in tank water rich in solids in a tank of an industrial or municipal reactor between 1 m and 10 m deep and used to permeate a water lean in solids, in one or more cleaning events, each cleaning event comprising the steps of:

(a) stopping permeation;

(b) draining the tank water from the tank to below the level of the membranes; and, (c) while the tank water is below the level of the membranes and permeation is stopped, flowing a chemical cleaner in pulses in which the chemical cleaner is delivered to the permeate sides of the membranes in a direction opposite to the direction in which water lean in solids normally permeates through the membranes separated by a time between pulses in which the chemical cleaner is not delivered to the membranes;

(d) refilling the tank; and (e) resuming permeation, wherein the pulses have a pressure which substantially reduces the relative size of local pressure variations inside membranes or portions of membranes at different elevations so as to provide a more even distribution of flux of cleaning chemical throughout the membranes.

2. The invention of claim 1 wherein the pulses have a pressure between 10 kPa and 55 kPa.

3. The invention of claim 1 wherein the membranes are vertically oriented hollow fibres fluidly connected to at least an upper header and the chemical cleaner flows into the membranes only through the upper header.

4. The invention of claim 3 wherein the membranes are between 1 m and 3 m in length and the flux of chemical cleaner through the membranes is between 30 and 55 $L/m^2/h$.

5. The invention of claim 1 wherein the flow of chemical cleaner is provided by a chemical cleaner pump and the speed of the pump is controlled to maintain a preselected pressure of the pulses.

6. The invention of claim 1 wherein the cleaning events are performed between 1 and 7 times per week.

7. The invention of claim 6 wherein the product of the concentration of the chemical cleaner expressed as an equivalent concentration of NaOCl in cleaning efficacy and the duration of all cleaning events in a week is between 2,000 minutes*mg/L and 20,000 minutes*mg/L.

8. The invention of claim 7 wherein in each pulse the chemical cleaner flows for between 10 seconds and 120 seconds and does not flow for between 30 seconds and five minutes.

9. The invention of claim 8 wherein the flux of chemical cleaner through the membranes is between 30 and 55 $L/m^2/h/bar$.

10. A method for cleaning filtering membranes, each membrane having a permeate side, normally immersed in tank water rich in solids in a tank of an industrial or municipal reactor between 1 m and 10 m deep and used to permeate a water lean in solids, in one or more cleaning events, each cleaning event comprising the steps of:

(a) stopping permeation;

(b) draining the tank water from the tank to below the level of the membranes; and, (c) while the tank water is below the level of the membranes and permeation is stopped, flowing a chemical cleaner in pulses in which the chemical cleaner is delivered to the permeate sides of the membranes in a direction opposite to the direction in which water lean in solids normally permeates through the membranes separated by a time between pulses in which the chemical cleaner is not delivered to the membranes;

(d) refilling the tank; and (e) resuming permeation, wherein the time between pulses is insufficient to allow the membranes to dry substantially from an initial wetted state and the duration of the flow of chemical cleaner in the pulses allows the membranes to be re-wetted to the initial state, the wetted state being one in which chemical cleaner contacts the membranes and its active ingredients have not been substantially consumed through reactions with solids fouling the membranes.

11. The invention of claim 10 wherein in each pulse the chemical cleaner flows for between 10 seconds and 120 seconds and does not flow for between 30 seconds and five minutes.

12. The invention of claim 11 wherein the time during which the chemical cleaner pump is on in each pulse is decreased if the flux of the chemical cleaner increases from an initial value.

* * * * *